(No Model.) 3 Sheets—Sheet 1.
F. C. BUTTERFIELD.
APPARATUS FOR SEPARATING VOLATILIZED METALS FROM OTHER COMMINGLED GASES.
No. 516,674. Patented Mar. 20, 1894.
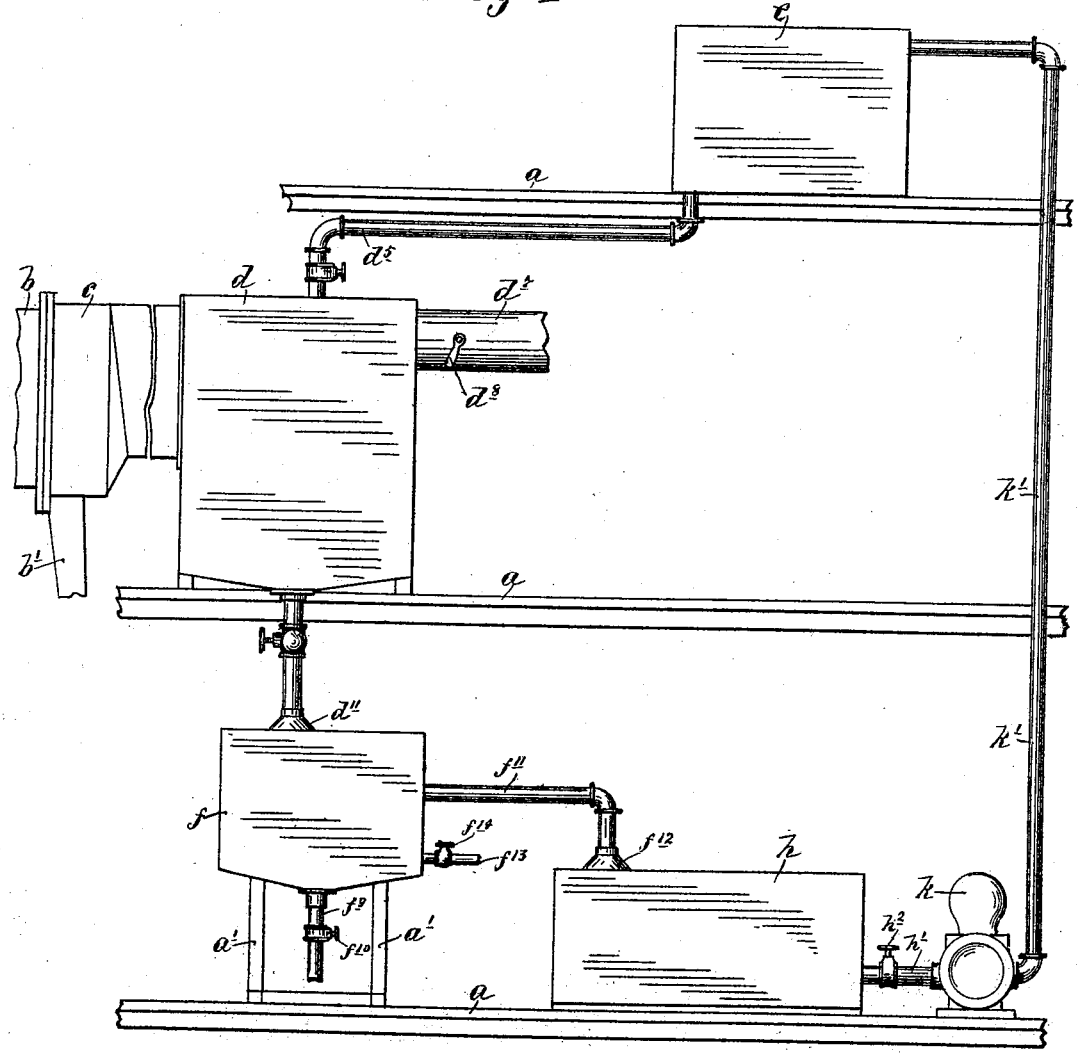

(No Model.) 3 Sheets—Sheet 2.
F. C. BUTTERFIELD.
APPARATUS FOR SEPARATING VOLATILIZED METALS FROM OTHER COMMINGLED GASES.
No. 516,674. Patented Mar. 20, 1894.
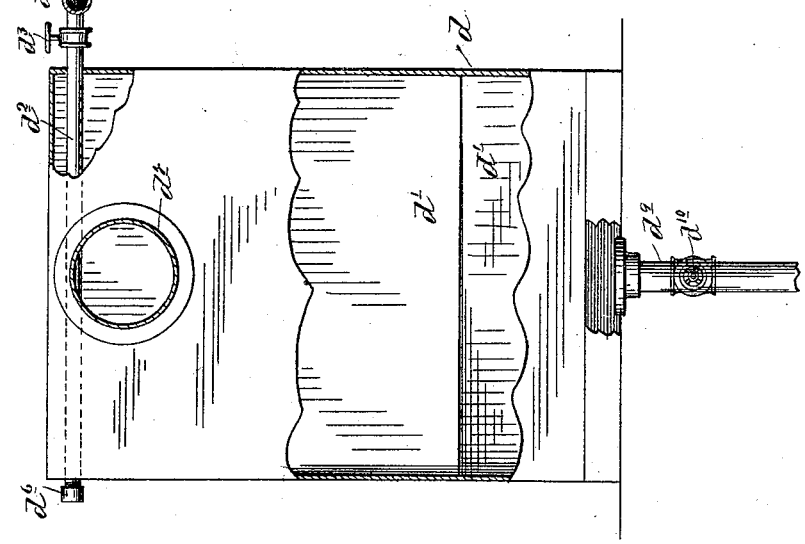
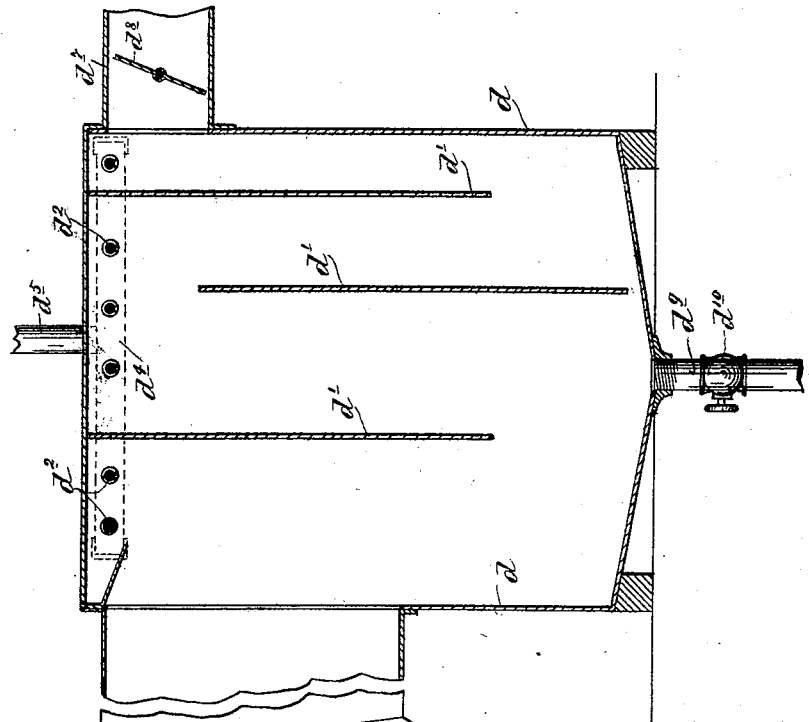

(No Model.) 3 Sheets—Sheet 3.
F. C. BUTTERFIELD.
APPARATUS FOR SEPARATING VOLATILIZED METALS FROM OTHER COMMINGLED GASES.
No. 516,674. Patented Mar. 20, 1894.
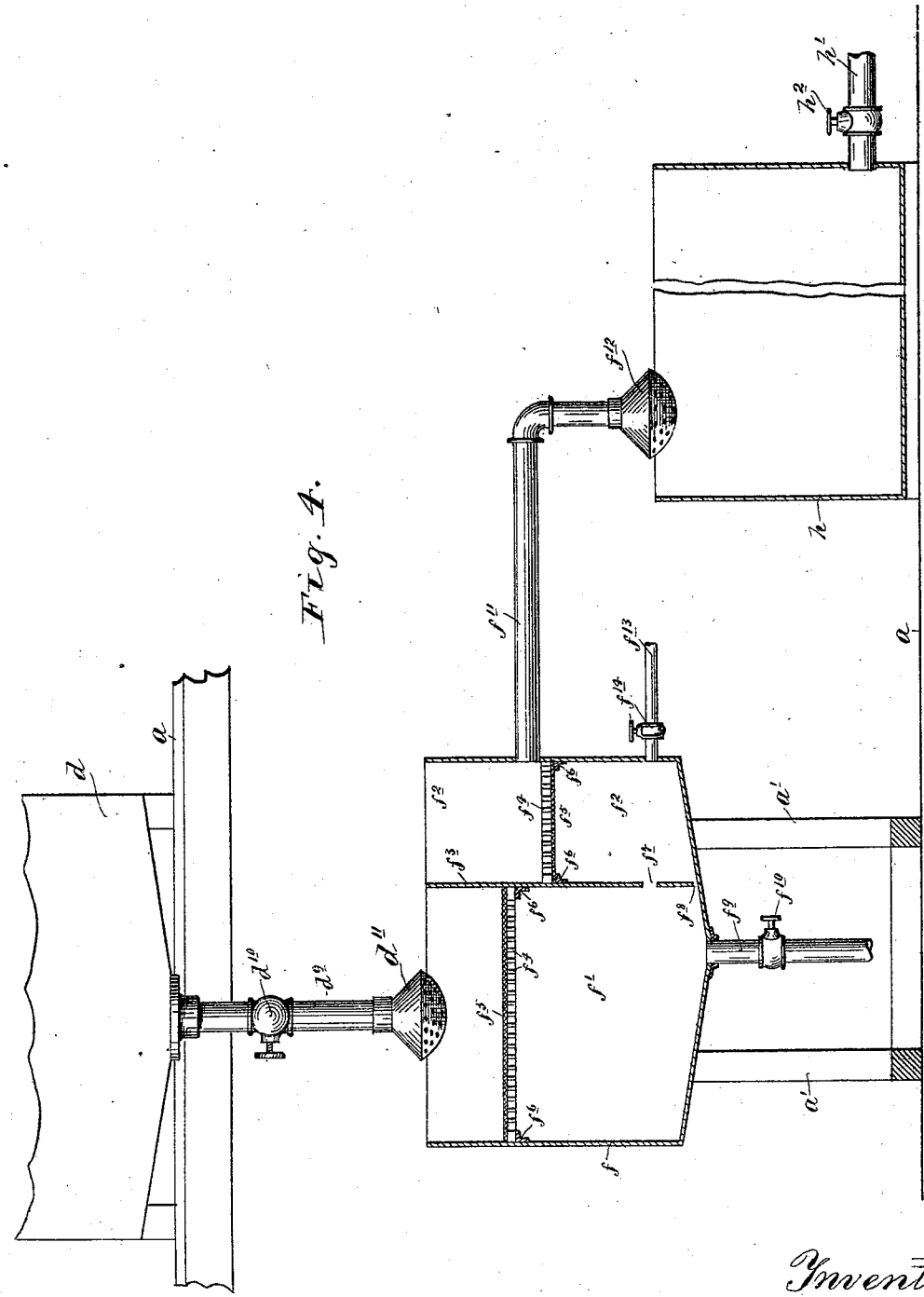

UNITED STATES PATENT OFFICE.

FESSENDEN C. BUTTERFIELD, OF MINNEAPOLIS, MINNESOTA, ASSIGNOR OF THREE-FOURTHS TO LOUIS S. CASS, OF SUMNER, IOWA, AND DANIEL B. BURDETT, OF MINNEAPOLIS, MINNESOTA.

APPARATUS FOR SEPARATING VOLATILIZED METALS FROM OTHER COMMINGLED GASES.

SPECIFICATION forming part of Letters Patent No. 516,674, dated March 20, 1894.

Application filed April 24, 1893. Serial No. 471,566. (No model.)

*To all whom it may concern:*

Be it known that I, FESSENDEN C. BUTTERFIELD, a citizen of the United States, residing at Minneapolis, in the county of Hennepin and State of Minnesota, have invented certain new and useful Improvements in Apparatus for Separating Volatilized Metals from other Commingled Gases; and I do hereby declare the following to be a full, clear, and exact description of the invention, such as will enable others skilled in the art to which it appertains to make and use the same.

My invention was especially designed for use in connection with the furnace for treating refractory ores, which is set forth and described in a companion application, Serial No. 471,565, filed of even date herewith; but is capable of use with all kinds of ore roasting furnaces, and generally, for the purpose of condensing and separating out volatilized metals from other commingled gases.

Furnaces of the classes described are the kind used for treating gold and silver bearing ores, preliminary to milling, amalgamation, and other subsequent treatments. When the ores are thus treated in the roasting furnaces, in connection with an oxidizing flame, in co-operation with a spraying device, a great many by-products, of value are volatilized and may be carried off with the products of combustion into a collecting chamber for further treatment and separation. Among these by-products may be mentioned for example, sulphur, phosphorus, arsenic, antimony, tellurium, &c.; and if tellurium be present in combination with the precious metals in the ores, the gold and silver will themselves be volatilized to a greater or less extent, and be carried over with the other by-products.

The purpose of my invention is to provide an efficient method of and apparatus for condensing and separating out these various volatilized mineral elements, from the products of combustion and other waste gases with which they are commingled when delivered from the furnace.

To these ends, the method consists first, in precipitating the volatilized metals by a condensing spray, of cooling liquid, such as water; second, in filtering the liquid, by passing the same through filtering mediums and settling chambers, to remove the materials held in suspension; third, in successively circulating the body of cooling liquid through the condenser, and the filtering and settling receptacle, until the same becomes charged to any desired degree with the mineral elements; and finally, in treating the charged body of liquid with heat or chemicals, or both, to remove the materials held in solution.

The apparatus is especially designed for carrying out or applying the above described process, or method, with efficiency and economy of operation.

The said process and apparatus will more fully appear from the following detailed description, and the novel features will be defined in the claims.

Referring to the accompanying drawings, wherein like letters refer to like parts throughout the several views,—Figure 1 is a front elevation, in diagram or outline, showing the entire apparatus with the circulating connection, some parts being broken away. Fig. 2 is a view partly in side elevation and partly in vertical section, from right to left, showing the condenser and its connections, some parts being broken away. Fig. 3 is a right side elevation of the condenser, as shown in Fig. 2, with some of the parts broken away and others removed; and Fig. 4 is a view chiefly in vertical sectional elevation, but partly in side elevation, showing the construction and arrangement of the settling and filtering receptacle, in relation to the condensing chamber, &c.

*a* represents floors or other supports, at different levels.

*b* represents the delivery end of a roasting furnace such for example, as that described in my companion case, and *b'* is the ore delivery chute from the same.

*c* represents the breeching for collecting the gases from the furnace *b*, and delivering the same to the condensing chamber *d*. This condensing chamber *d* is provided with collecting and deflecting surfaces *d'*, shown as consisting of thin vertical partial partitions in staggered relation to each other. The condensing chamber is also provided with liquid spraying devices $d^2$, at its upper end, shown as in the form of a series of perforated pipes, which are provided with valves $d^3$ and are independently removable from a common distributing head or pipe $d^4$, at the back of the chamber, which is in communication through supply pipe $d^5$, with an elevated tank $e$. The spraying pipes $d^2$ enter the condensing chamber at the back, as shown (see Fig. 3), and project through the front wall of the same; and are provided at their forward projecting ends with removable caps $d^6$, by means of which construction the pipes $d^2$ may be readily inspected and separately cleaned when necessary. The condensing chamber $d$ is also provided with a valved outlet flue $d^7$, $d^8$, for the free or waste gases, located near the top of the chamber; and with a valved liquid discharge pipe $d^9$ $d^{10}$, in its bottom, for conducting off the liquid matter. The liquid discharge pipe $d^9$ delivers through a strainer $d^{11}$ into the filtering and settling receptacle $f$. This receptacle $f$ is supported in any suitable way, as by uprights $a'$ rising from the lowermost of the floors or supports $a$. The receptacle $f$ is divided into two communicating compartments $f'$ $f^2$ by a vertical partition $f^3$, each of which is provided with filter racks and filtering mediums $f^4$ $f^5$ supported by angular flanges $f^6$. The filtering mediums will be of cloth or other fibrous fabric suitable for the purpose. In the compartment $f'$, the filtering mediums are located on top of the rack $f^4$, while in the compartment $f^2$, the filtering mediums are located on the under side of the rack $f^4$, and preferably, at a lower level than the corresponding parts in the compartment $f'$. The communicating passage $f^7$, between the compartments $f'$ $f^2$ is located in the partition $f^3$, at a point above the floor level of the receptacle, and below the lowermost of the filters $f^4$ $f^5$. A passage $f^8$ is also provided beneath a part or the whole of the partition $f^3$, to permit the sediments or deposits from the chamber $f^2$ to pass through the same to the lowest point of the receptacle, which is fitted with a valved discharge or draw-off pipe $f^9$ $f^{10}$.

$f^{11}$ is the outflow pipe from the receptacle $f$, at a point in the compartment $f^2$ above the level of the filter located therein, and delivering through a strainer $f^{12}$ into a tank $h$, supported, as shown, on the lower floor or support $a$. Only one of the tanks $h$ is shown; but in practice, a relay of two or more would be employed. The tank $h$ connects, by a valved pipe $h'$ $h^2$, with a pump $k$ having its delivery pipe $k'$ extended upward and delivering into the elevated tank $e$.

The operation is as follows: All the gases from the furnace $b$ are delivered through the breeching $c$ into the condensing chamber $d$. In this chamber the hot gases are subjected to the cooling action of a spray of water or other liquid from the pipe $d^2$, by means of which the volatilized metals will be condensed and passed, with the spraying liquid, through the pipe $d^9$ and strainer $d^{11}$ into the filtering and settling receptacle $f$; while the free gases will pass out through the flue $d^7$ to the stack or open air. The liquid discharged from the strainer $d^{11}$ will be first filtered downward through the filter in the compartment $f'$. A large part of the materials held in suspension will be caught on the top of this primary filter. The liquid will then pass through the passage $f^7$ and up through the filter located in the compartment $f^2$. The filtering mediums of this secondary filter may be of a finer grade than those of the primary filter, and will separate out most of the remaining materials held in suspension in the liquid. The liquid, passing through the secondary filter, will then be delivered through the outflow pipe $f^{11}$ and the strainer $f^{12}$ into the tank $h$; and by the pump $k$ and its connections will be redelivered to the elevator reservoir or tank $e$, for re-use through the condensing chamber and the filtering and settling receptacle. In this way the water or other cooling liquid is used over and over again until charged to the point of saturation or any other desired degree, with such of the mineral products as will be taken up and held by the water in solution. The charged water will then be treated either with heat or with chemicals or in both ways, to separate out the mineral matters therein held in solution. In its passage through the receptacle $f$, there will be a body or stratum of comparatively undisturbed liquid under the filters in both of the compartments $f'$ and $f^2$. Many of the heavier materials will be thereby permitted to settle, by gravity, to the bottom of the receptacle $f$, and may be removed at will. The said receptacle is provided with a valved draw-off pipe $f^{13}$ $f^{14}$, above the floor level of the same, for the purpose of drawing off the liquid, when it is desired to remove the deposits which have settled to the bottom of the receptacle $f$.

The special purpose of the strainers $d^{11}$ and $f^{12}$ is to assist in cooling the hot liquid, by throwing the same in a divided state into contact with the open air. The tanks $h$ are made relatively large, for the same purpose of cooling the liquid before re-pumping the same to the elevated reservoir $e$, for re-use through the spraying pipes in the condenser. If the liquid is still too hot, ice might, of course, be applied either in the tank $h$ or the reservoir $e$.

It will, of course, be understood that the number of the spraying pipes $e^2$ and the number of the deflecting and collecting surfaces $e'$, may be increased in number to any desired extent in order to produce the most efficient action in the condenser. Likewise it will be understood that the number of compartments and the number of filters in the filtering and settling receptacle $f$, may be increased at will, in order to perfect the filtering and settling actions.

It is, of course, understood that the filtering grates $f^4$, which carry the filtering mediums $f^5$, are removable, at will, for clearing the same from the collected materials and keeping the same in proper condition for the filtering action.

Chemicals may be used with the spraying liquid, if found desirable.

What I claim, and desire to secure by Letters Patent of the United States, is as follows:

1. The combination with the ore roasting furnace, of the breeching collecting the gases therefrom, the condenser receiving from the breeching and provided with liquid spraying pipes, deflecting surfaces, a valved liquid outlet and a valved outlet flue for the free gases, the receptacle receiving from the condenser and provided with filtering mediums and settling chambers, the tank receiving from said filtering and settling receptacle, and the pump with circulating connections for successively circulating the same liquid, substantially as and for the purpose set forth.

2. In an apparatus for treating refractory ores a filtering chamber constructed with a receiving and a delivery compartment in communication below the liquid level, the horizontal filtering mediums, one in each of said compartments located respectively, one above and the other below the liquid level, and an outflow passage leading from said delivery compartment at the liquid level, substantially as and for the purpose set forth.

In testimony whereof I affix my signature in presence of two witnesses.

FESSENDEN C. BUTTERFIELD.

Witnesses:
JAS. F. WILLIAMSON,
EMMA F. ELMORE.